(12) United States Patent
Krauss

(10) Patent No.: US 8,992,647 B2
(45) Date of Patent: Mar. 31, 2015

(54) DROPLET SEPARATOR PACK HAVING LATCHABLE RETAINING STRIPS

(71) Applicant: Roland Krauss, Hueckelhoven (DE)

(72) Inventor: Roland Krauss, Hueckelhoven (DE)

(73) Assignee: Munters Euroform GmbH, Aachen (DE)

( * ) Notice: Subject to any disclaimer, the term of this patent is extended or adjusted under 35 U.S.C. 154(b) by 0 days.

(21) Appl. No.: 14/349,427

(22) PCT Filed: Oct. 9, 2012

(86) PCT No.: PCT/DE2012/001001
§ 371 (c)(1),
(2) Date: Apr. 7, 2014

(87) PCT Pub. No.: WO2013/056692
PCT Pub. Date: Apr. 25, 2013

(65) Prior Publication Data
US 2014/0260134 A1 Sep. 18, 2014

(30) Foreign Application Priority Data
Oct. 18, 2011 (DE) .................. 20 2011 106 925 U

(51) Int. Cl.
*B01D 45/00* (2006.01)
*B01D 45/08* (2006.01)
*B01D 45/06* (2006.01)

(52) U.S. Cl.
CPC ............... *B01D 45/08* (2013.01); *B01D 45/06* (2013.01)
USPC ................... 55/436; 55/440; 55/442; 55/443; 55/444; 55/445; 55/446

(58) Field of Classification Search
CPC .......... B01D 45/08; Y10S 55/14; A47L 5/24; A47L 9/08; A47L 9/102
USPC .................................... 55/436, 440, 442–446
See application file for complete search history.

(56) References Cited

U.S. PATENT DOCUMENTS

| 4,968,328 A | 11/1990 | Duke |
| 5,296,009 A | 3/1994 | Duke |
| 7,931,721 B2 * | 4/2011 | Kanka et al. ................... 55/418 |
| 2009/0320689 A1 | 12/2009 | Krell |

* cited by examiner

*Primary Examiner* — Dung H Bui
(74) *Attorney, Agent, or Firm* — Andrew Wilford

(57) ABSTRACT

A droplet separator pack having at least two elongate lamella droplet separator profiles is described. Retaining strips that have a planar front and rear face and side faces adapted to the curved shape of the lamella droplet separator profiles are arranged between the lamella droplet separator profiles at at least one end thereof. The retaining strips include latching connection means for clipping together wherein the corresponding lamella droplet separator profiles are clipped together between adjacent retaining strips. In this manner droplet separator packs can be assembled in a simple manner at the place of installation.

1 Claim, 3 Drawing Sheets

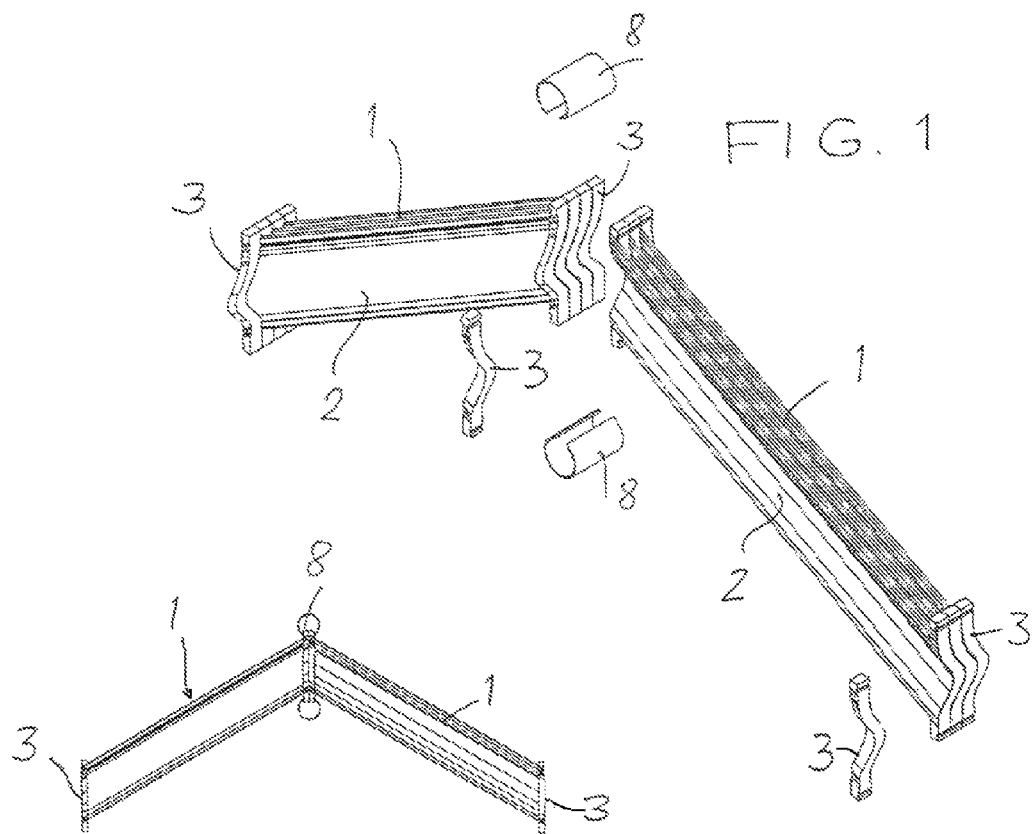
FIG. 1
FIG. 3
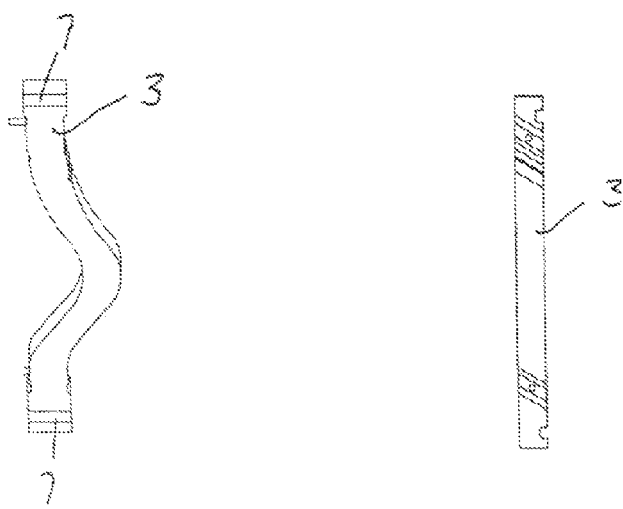
FIG. 2a
FIG. 2b

DROPLET SEPARATOR PACK HAVING LATCHABLE RETAINING STRIPS

CROSS REFERENCE TO RELATED APPLICATIONS

This application is the US-national stage of PCT application PCT/DE2012/001001 filed 9 Oct. 2012 and claiming the priority of German patent application 202011106925.0 itself filed 18 Oct. 2011.

FIELD OF THE INVENTION

The present invention is directed to a droplet separator pack comprising at least two elongate lamella droplet separator profiles arranged parallel to one another and curved in cross-section.

BACKGROUND OF THE INVENTION

Such a droplet separator pack is known. Such a pack includes a plurality of elongate lamella droplet separator profiles arranged parallel to one another that are connected by means of end walls extending perpendicularly to the profiles so that a corresponding pack results. The lamella droplet separator profiles themselves are curved in cross-section so that a gas stream passing the droplet separator pack (the spaces between the individual profiles) is deflected on its flow path whereby the droplets entrained in the gas stream are separated at the profiles. Such lamella droplet separator profiles are known.

Such droplet separator packs are mounted against one another in order to cover corresponding flow channels, for instance in flue gas desulphurization installations. In this case, the respective end walls are used for the installation of the packs on corresponding support structures or at adjacent droplet separator packs. For example, the end wall arranged at the edge of the flow channel is supported at a support structure while the end wall pointing to the middle of the flow path is connected to the end wall of an adjacent droplet separator pack or is also supported on a support structure. Such an installation is known.

Furthermore, it is known to manufacture such droplet separator packs by welding the individual lamella droplet separator profiles to continuous end walls extending perpendicularly to the profiles. The packs provided with the end walls are transported in this condition to the place of installation and are mounted there, i.e. are fixed at the corresponding support structures or at other droplet separator packs.

It is known to design such droplet separator packs for horizontally arranged droplet separators (so-called flat separators) or for roof-shaped or V-shaped droplet separators. With the droplet separator packs for flat separators the end walls extend perpendicularly to the lamella droplet separator profiles while they define with the profiles an angle deviating from 90° with roof-shaped or V-shaped separators. For example, with a roof-shaped separator two adjacent droplet separator packs with opposite inclination form a separator wherein the two adjacent end walls of the two packs are fixed at one another while the respective other end walls are supported on or at support structures. With a V-shaped separator a corresponding construction is used wherein here the packs are inclined in a V-shaped manner. Corresponding constructions are present with a flat separator wherein in this case the profiles extend horizontally.

Such droplet separator packs consisting of a plurality of individual separator profiles that are connected through end walls have certain disadvantages with respect to their transport since they require a lot of space.

OBJECT OF THE INVENTION

The present invention aims at an improvement in this respect. It is the object of the invention to provide a droplet separator pack of the cited kind that can be transported in an especially simple and space-saving manner.

SUMMARY OF THE INVENTION

According to the invention this object is obtained by a droplet separator pack comprising at least two elongate lamella droplet separator profiles arranged parallel to one another and curved in cross-section wherein retaining strips with planar front and rear faces and side faces adapted to the curved shape of the lamella droplet separator profiles are arranged between the lamella droplet separator profiles at at least one end thereof and wherein furthermore one side face is provided with a latching projection and the other side face is provided with a latching recess and the lamella droplet separator profiles have apertures through which the latching projections extend for latchingly clipping the retaining strips to one another with lamella droplet separator profiles arranged therebetween.

The present invention is based on the basic idea to design a droplet separator pack in such a manner that the same can be simply assembled only just in situ, i.e. at the place of installation. This cannot be realized by welding together the droplet separator profiles and the end walls at the place of installation. Instead, the invention suggests the separation of the continuous end walls into a plurality of retaining strips that can be latched with one another and between which the individual separator profiles are fixed by clamping. A profile is arranged between two respective retaining strips that has an aperture in its end portion through which the latching projections of the retaining strips are stuck. Then, these latching projections are latched or clipped to one another with the latching recess of the next retaining strip whereby the profile arranged therebetween is fixed. Accordingly, the latching means grasp through the profile whereby a detachment of the profile is prevented. Furthermore, a fixation is achieved by the clamping engagement obtained by the latching means.

In this manner, alternately profiles and retaining strips are clipped to one another at the place of installation until the desired droplet separator pack results. Then, the adjacent retaining strips also form together an end wall that can be used for the fixation at a support structure or at an end wall of another droplet separator pack.

Preferably, the retaining strips project upwardly and downwardly beyond the lamella droplet separator profiles. These projecting end portions can be used for support or fixation purposes of the packs, for instance by inserting these projecting end portions into receiving grooves of support structures by clamping theses portions with portions of adjacent droplet separator profile packs.

Furthermore, the above-cited object is achieved by a droplet separator pack comprising at least two elongate lamella droplet separator profiles arranged parallel to one another and curved in cross-section wherein retaining strips with planar front and rear faces and side faces adapted to the curved shape of the lamella droplet separator profiles are arranged between the lamella droplet separator profiles at at least one end thereof and wherein furthermore one side face has a latching projection and the other side face has a latching recess for latchingly clipping together adjacent retaining strips with lamella droplet separator profiles arranged therebetween and the retaining strips have a projection that can be stuck through an aperture in the lamella droplet separator profile.

According to this embodiment the latching connection means are separate from the means for retaining the lamella droplet separator profiles arranged therebetween (projection and aperture in the lamella droplet separator profile). Here, the projection of the retaining strip has only the object to hold the adjacent lamella droplet separator profile by extending through a corresponding aperture in the lamella droplet separator profile in the assembled condition of the pack. The latching takes place through the latching connection means of the retaining strips that are clipped together with the latching connection means of the adjacent retaining strips and take up between them the lamella droplet separator profiles in clamping engagement.

Preferably, in this case the projection and latching recess are arranged at an end portion of the retaining strips extending beyond the lamella droplet separator profiles upwardly and/or downwardly. Accordingly, in this embodiment according to the invention a portion of the retaining strips projecting upwardly and/or downwardly beyond the lamella droplet separator profiles is used in order to arrange the latching connection means. As mentioned, this is realized independently of the retaining means for the lamella droplet separator profiles arranged therebetween. Accordingly, these retaining means can be designed in an especially simple manner. For example, the projection can be a peg extending through a bore in the lamella droplet separator profile. Such a bore can be simply produced without requiring extensive processing steps at the profiles.

The projection (peg) can be stuck through an aperture in the lamella droplet separator profile and extends preferably up into a corresponding aperture of the adjacent retaining strip that is arranged on the opposite side of the same opposite to the projection in the assembled condition of the pack.

The droplet separator pack designed according to the invention is suited not only for flat separators but also for roof-shaped or V-shaped separators. In the design for a flat separator the lamella droplet separator profiles are formed rectangularly wherein the retaining strips extend perpendicularly with respect to the longitudinal axis of the profiles. In the design for roof-shaped or V-shaped separators the lamella droplet separator profiles are formed in a parallelogram-like manner and define an angle deviating from 90° with the retaining strips. This angle corresponds to the inclination of the packs in the finished roof-shaped or V-shaped separator.

According to the last-mentioned embodiment the retaining strips have grooves and ridges on their side faces in adaption to the inclined lamella droplet separator profiles. Accordingly, the profiles extend obliquely with respect to the retaining strips wherein the side faces are correspondingly obliquely recessed and raised in adaption to the curvature of the profiles. Accordingly, after the installation of the retaining strips the same sit close to the profiles in a positive manner wherein the front faces of the profiles end with the front face of the retaining strips.

Preferably, the retaining strips have a transverse groove in the upper and/or lower end portion. This transverse groove can serve for the installation of clamping means by means of which the row of the retaining strips of opposite droplet separator packs is fixed to one another. For example, these clamping means are formed by a slotted tube-like clamping member the free ends of which engage into the grooves of oppositely arranged retaining strips (with pre-stress so that a corresponding clamping effect results).

The latching connection means for clipping the individual retaining strips together preferably have a projecting peg and a latching recess complementary to the peg. Preferably, such latching ensures that the retaining strips can be only separated from another again by means of a certain force expense so that an unintended separation of the packs is excluded. Corresponding latching means with which such a connection can be realized are known. For example, for this case pegs can have corresponding thickenings that cooperate with narrowings of the latching recesses.

As mentioned above, the invention is also related to a droplet separator pack consisting of two droplet separator pack halves arranged with opposite inclination and connected by means of corresponding retaining strips. Furthermore, the invention concerns a retaining strip for a droplet separator pack of the above-described kind.

BRIEF DESCRIPTION OF THE DRAWING

In the following, the invention is described by means of examples in connection with the drawing in detail. Of the drawing FIG. 1 shows a spatial representation of two droplet separator packs with separately shown retaining strips and clamping members;

FIG. 2a is a front view;

FIG. 2b is a side view of a retaining strip;

FIG. 3 shows a front view of two droplet separator packs mounted to one another and forming together a V-shaped droplet separator;

SPECIFIC DESCRIPTION OF THE INVENTION

Figure 4A:
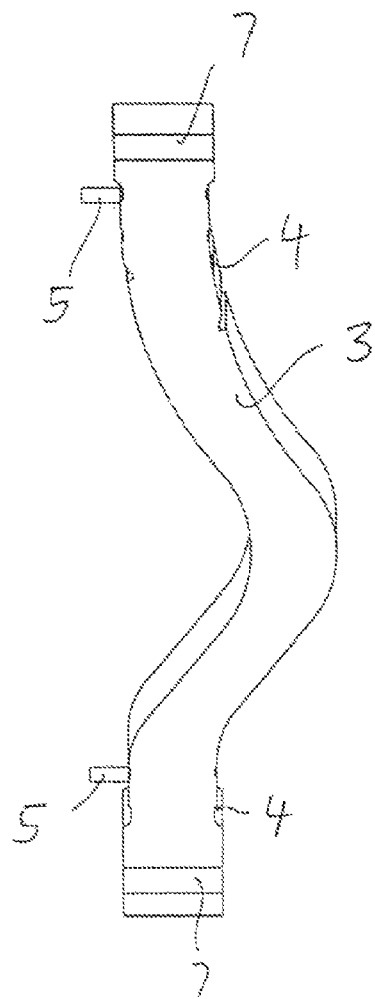
FIGS. 4a and 4b are views like FIGS. 2a and 2b in an enlarged scale.
Figure 4B:
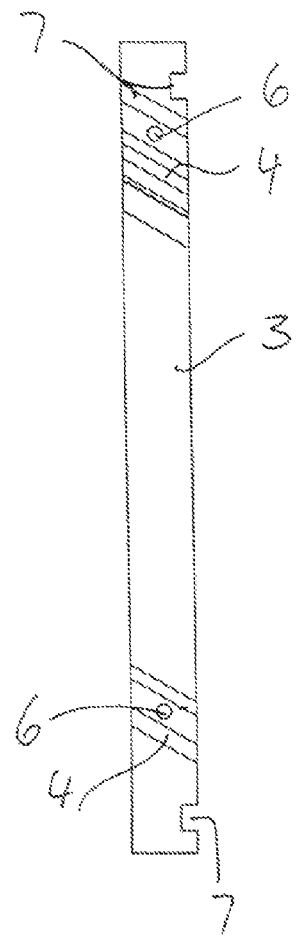

FIG. 1 shows two droplet separator packs 1 that each consist of a plurality of lamella droplet separator profiles 2 arranged parallel to one another and of respective retaining strips 3. The lamella droplet separator profiles 2 are known droplet separator profiles that are curved in cross-section. The specific shape of these lamella droplet separator profiles is not important for the invention. It is only important that curved flow paths for a gas stream carrying droplets are formed between these profiles 2 and that droplets separated at these profiles 2 on account of these curved flow paths are then discharged by suitable collecting means (not shown).

Furthermore, the droplet separator packs 1 include retaining strips 3 that are shown in detail in FIGS. 2a, 2b, 4a, and 4b. These retaining strips 3 each have a planar front face and a planar rear face as well as curved side faces that conform to the curvature of the lamella droplet separator profiles 2. Complementary grooves and ridges on the side faces of the profiles are shown at 4.

The individual lamella droplet separator profiles 2 are approximately shaped as parallelograms and extend at an angle deviating from 90° from the retaining strips 3. A profile 2 is arranged between two respective retaining strips 3, and the ends of the profiles are clamped between these two retaining strips 3. Adjacent retaining strips 3 are clipped to one another or are latched together and the droplet separator pack 1 is fitted together with two latching pegs 5 on one side face of each retaining strip 3 engaged into complementary recesses 6 on the confronting side face. In order to hold the profiles 2 the pegs 5 extend through respective holes in the ends of the profiles 2. The retaining strips 3 clipped to one another together form respective end walls at the two ends of the profiles 2 that serves for the support or fixation of the droplet separator pack at a support structure or for the connection to an adjacent droplet separator pack.

Figure 5:
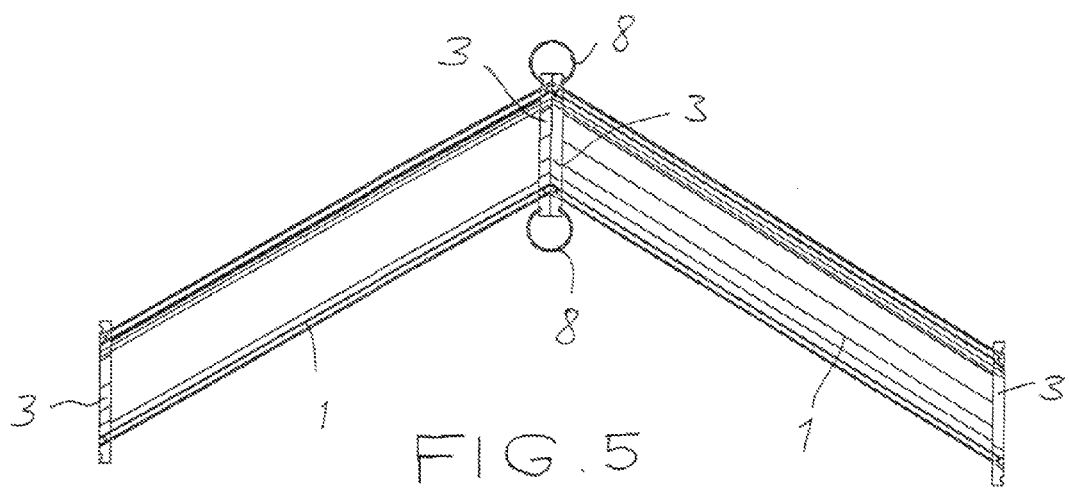
FIG. 5 is a view like FIG. 3 in an enlarged scale.

The connection of two droplet separator packs 1 with opposite inclination is here realized by two tubular clips 8 that, as shown in FIGS. 3 and 5, engage into transverse grooves 7 at the upper and lower ends of the retaining strips 3 and that clamp together the two oppositely arranged rows of retaining strips 3. Here, the inverted V-shaped separator shown in FIGS. 3 and 5 results that consists of two droplet separator packs with opposite inclination.

While above a shape curved in cross-section of the individual lamella droplet separator profiles is mentioned this shape shall also cover angled profiles. It is only important that the profiles are able to generate flow paths deviating from a straight path.

Figure 6:
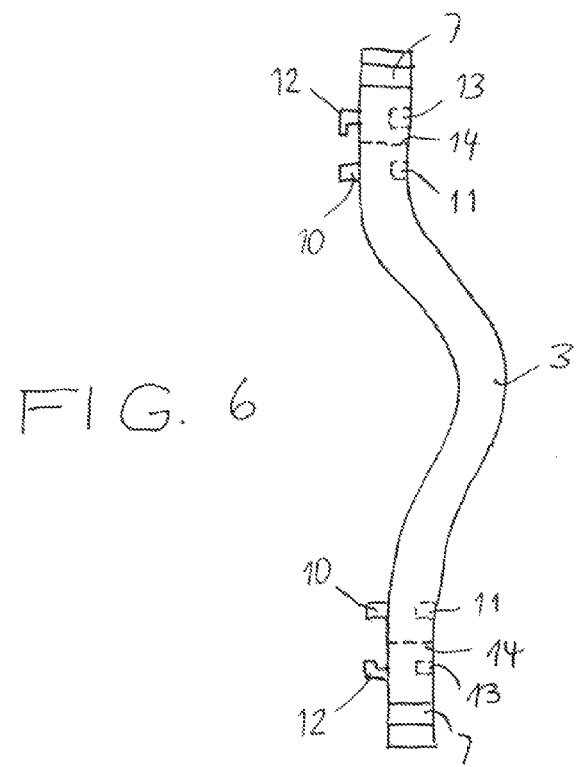
FIG. 6 is a front view of another embodiment of a retaining strip.

A front view of another embodiment of a retaining strip is schematically shown in FIG. 6. In this embodiment all the features of the above-described embodiment are used where there is no reference to other features. While with the above-described embodiment the means for latching and for holding the lamella droplet separator profiles arranged therebetween are the same parts, they are separate in this embodiment. The retaining strip 3 is correspondingly formed like the retaining strip of the above-described embodiment. However, in this case it includes latching connection means 12, 13 that are formed like projecting latching pegs on one side face and as corresponding recesses on the opposite side face of the retaining strip 3. In the embodiment of FIG. 6 such latching connection means are provided not only at the upper end but also at the lower end of the retaining strip 3. A separate projection 10 in the shape of a peg that serves for holding a lamella droplet separator profile (not shown) with the peg extending through a corresponding aperture of the profile into an aperture 11 on the other side face of the retaining strip 3. In this embodiment the retaining strips 3 are longer or higher than the associated profiles that extend upwardly and downwardly only to the broken lines 14 in the assembled condition of the pack. This way, the latching connection means 12, 13 arranged thereabove or therebelow can be clipped together with the latching connection means of an adjacent retaining strip.

In this embodiment corresponding transverse grooves 7 are provided for corresponding clamping members, too.

The invention claimed is:

1. A droplet separator comprising: two packs of elongated parallelogrammatic profiles of curved or angled cross-sectional shape and each having parallel and longitudinally extending side edges and parallel and transversely extending end edges extending at an angle different from 90° the respective side edges, the profiles of each pack being transversely aligned with and spaced from one another, each profile being formed adjacent each end edge with at least one throughgoing hole; respective retaining strips fitted between ends of adjacent flanking profiles in each of the packs, of a shape corresponding to the curved or angled cross-sectional shape of the profiles, having opposite, parallel, and planar side faces extending transversely between the profiles between which they are fitted and opposite nonplanar and parallel side faces bearing against the flanking profiles, and each having upper and lower opposite end portions projecting transversely past the profiles of the respective packs, one of the nonplanar side faces being formed with at least one recess aligned with the hole of the respective flanking profile; a respective peg on the other of the nonplanar sides of each of the strips extending transversely through the hole of the respective flanking profiles into the recess of the strip on the other side of the respective flanking profile; and a slotted tubular clip securing together the projecting end portions of the strips at one end of one of the packs to the ends of the strips at one end of the other of the packs such that the two packs extend downward from the secured-together ends, one of the planar side faces of each of the retaining strips having a cross groove in the respective upper or lower end portion cooperating with the clip.

\* \* \* \* \*